United States Patent
Nishinaka et al.

(12)

(10) Patent No.: US 6,475,624 B1
(45) Date of Patent: Nov. 5, 2002

(54) POLYIMIDE/FLUORORESIN LAMINATES, PRODUCING METHOD THEREOF, AND INSULATING TAPE FOR WIRE-WINDING USING THE SAME

(75) Inventors: Masasru Nishinaka, Otsu (JP); Kazuhiro Ono, Otsu (JP); Kiyokazu Akahori, Otsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/443,382

(22) Filed: Nov. 19, 1999

(30) Foreign Application Priority Data

Nov. 20, 1998 (JP) ............................................ 10-331728

(51) Int. Cl.$^7$ ........................ B32B 27/08; B32B 27/30; B32B 31/00; B32B 31/26
(52) U.S. Cl. ..................... 428/421; 428/422; 428/473.5; 427/393.5
(58) Field of Search ................................ 428/421, 422, 428/473.5; 524/127, 128, 140, 141, 148, 166, 177, 178, 398; 427/393.5

(56) References Cited

U.S. PATENT DOCUMENTS

| 4,742,099 A | 5/1988 | Nagano et al. .............. 524/115 |
| 5,130,192 A | 7/1992 | Takabayashi et al. ........ 428/332 |
| 5,218,034 A | 6/1993 | Milligan et al. ............. 524/399 |
| 5,272,194 A | 12/1993 | Arduengo, III et al. ..... 524/177 |
| 5,399,434 A | * 3/1995 | Katz et al. .................. 428/421 |

FOREIGN PATENT DOCUMENTS

JP    11-71474    3/1999

* cited by examiner

*Primary Examiner*—Paul Thibodeau
*Assistant Examiner*—Ramsey Zacharia
(74) *Attorney, Agent, or Firm*—Fitch, Even, Tabin & Flannery

(57) ABSTRACT

A polyimide/fluororesin laminate comprises a polyimide film and a fluororesin layer. The tear propagation resistance strength of the polyimide film after being exposed to 150° C. 100% RH environment for 12 hours is not less than 80% of the tear propagation resistance strength of the polyimide film before exposure. Particularly, the polyimide film contains at least one of Al, Si, Ti, Mn, Fe, Co, Cu, Zn, Sn, Sb, Pb, and Bi. The laminate is useful for an insulating tape for wire-winding.

10 Claims, No Drawings

POLYIMIDE/FLUORORESIN LAMINATES, PRODUCING METHOD THEREOF, AND INSULATING TAPE FOR WIRE-WINDING USING THE SAME

BACKGROUND OF THE INVENTION

1. Field of the Invention

The present invention relates to a polyimide/fluororesin laminate, and an insulating tape for wire-winding obtained by processing the laminate into a tape form. More particularly, the present invention relates to a polyimide/fluororesin laminate, and an insulating tape for wire-winding being excellent in hydrolysis resistance. The polyinde/fluororesin laminate of the present invention is wound in a tape form around a conductor such as copper, and is used for a coil or a cable in a motor, a wire in an aircraft, or the like.

2. Description of Related Art

Polyimide has excellent properties such as electric insulation, heat resistance, and chemical resistance. A polyimide/fluororesin laminate, which is obtained by coating one or both surfaces of a polyimide film with fluororesin, is advantageously processed into a tape form and used for coating a conductor to produce a coated wire.

Especially, in recent years, electric devices are becoming more and more efficient and highly functional, leading to wide use of these electric devices under a high temperature and high humidity environment. Further, the amount of electric current through a wire is increasing, and the wire is often exposed to higher temperatures in accordance with heat generation.

Under these environments, however, there is a problem that the polyimide resin in the polyimide/fluororesin laminate undergoes hydrolysis, thereby decreasing the dielectric breakdown voltage of the coated portion.

SUMMARY OF THE INVENTION

The inventors of the present invention have made an eager research to solve the above-mentioned problems of the prior art and to provide a polyimide/fluororesin laminate being excellent in hydrolysis resistance and an insulating tape for wire-winding using the same. As a result, using a polyimide film having a high resistance to an environment of high temperature and high humidity, the inventors of the present invention have found out that a polyimide/fluororesin laminate and an insulating tape for wire-winding being excellent in hydrolysis resistance can be obtained. Further, the inventors have found out that a polyimide film containing at least one kind of an element selected from the group consisting of Al, Si, Ti, Mn, Fe, Co, Cu, Zn, Sn, Sb, Pb, and Bi has an excellent resistance to the environment of high temperature and high humidity, thereby completing the present invention.

A polyimide/fluororesin laminate according to the present invention comprises a polyimide film and a fluororesin layer and is characterized in that a retention of tear propagation resistance strength of the polyimide film after being exposed to 150° C. 100% RH environment for 12 hours is not less than 80% of the tear propagation resistance strength of the polyimide film before exposure.

Further, in the polyimide/fluororesin laminate according to the present invention, the polyimide film contains at least one kind of an element selected from the group consisting of Al, Si, Ti, Mn, Fe, Co, Cu, Zn, Sn, Sb, Pb, and Bi.

An insulating tape for wire-winding according to the present invention is obtained by processing a polyimide/fluororesin laminate of the invention into a tape form.

Since the polyimide/fluororesin laminate according to the present invention is made of polyimide having a high resistance to a high temperature and high humidity environment, it is excellent in hydrolysis resistance and, when the laminate is processed into a tape form and wound around a conductive wire, a coated wire being excellent in hydrolysis resistance is obtained. This provides an advantage that an insulating tape for wire-winding is provided which can be used for a coil or a cable in a motor, a wire in an aircraft, or the like, operating with no quality defect under a severe environment of high temperature and high humidity.

DESCRIPTION OF THE PREFERRED EMBODIMENTS

The term "gel film" as used herein in the present invention means a film in a partially cured or partially dried state in the reaction process of imidizing polyamic acid to form polyimide, in which the polyamic acid is mixed with the polyamide imidized, which has self-supporting properties. And the term "retention" in the present invention means a ratio of a tear propagation resistance strength of a polyimide film after being exposed to 150° C. 100% RH environment for 12 hours against the initial tear propagation resistance strength of the polyimide film before exposure.

The polyimide/fluororesin laminate according to the present invention is characterized in an excellent resistance to hydrolysis. In particular, it is a polyimide/fluororesin laminate being excellent in resistance to hydrolysis which is obtained by using a polyimide film having an excellent resistance under a high temperature and high humidity environment. Specifically, a polyimide film having a high retention of tear propagation resistance strength after being exposed to a high temperature and high humidity environment.

Hereafter, embodiments of the polyimide/fluororesin laminate according to the present invention will specifically be described.

First, explanation will be given on a polyimide film capable of being used in the polyimide/fluororesin laminate according to the present invention.

The polyimide film to be used in the present invention can be produced by a known method. Namely, it is produced by applying an organic solvent solution of polyamic acid, which is a precursor of the polyimide, onto a support by flow casting, and chemically or thermally imidizing the polyamic acid.

The polyamic acid as a precursor of the polyimide used in the present invention is typically produced by dissolving at least one kind of an aromatic acid dianhydride and at least one kind of diamine in substantially equimolecular ratios in an organic solvent and stirring the solution under a controlled temperature condition until the polymerization is completed.

Examples of suitable acid anhydrides for use in synthesis of the polyamic acid according to the present invention include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2', 3,3'-biphenyltetracarboxylic dianhydride, 3,3'4,4'-benzophenonetetracarboxylic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4- dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylenebis (trimellitic acid monoester acid anhydride), ethylenebis(trimellitic acid monoester acid anhydride), (bisphenol A)bis(trimellitic acid monoester acid anhydride), and analogs thereof.

Among these, the most suitable acid dianhydrides for use in the polyimide/fluororesin laminate according to the present invention are pyromellitic dianhydride, 3,3'4,4'-benzophenonetetracarboxylic dianhydride, 3,3'4,4'-biphenyltetracarboxylic dianhydride, and p-phenylenebis (trimellitic acid monoester acid anhydride). A single one of these or a mixture of these at an arbitrary ratio may be preferably used.

Examples of suitable diamines for use in synthesis of the polyamic acid according to the present invention include 4,4'-diaminodiphenylpropane, 4,4'-diaminodiphenylmethane, 3,3'-dimethylbenzidine, 3,3'-dimethoxybenzidine, 3,3'-dichlorobenzidine, 4,41-diaminodiphenyl sulfide, 3,3'-diaminodiphenylsulfone, 4,4'-diaminodiphenylsulfone, 4,4'-diaminodiphenyl ether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl-N-methylamine, 4,4'-diaminodiphenyl-N-phenylamine, 1,4-diaminobenzene (p-phenylenediamine), 1,3-diaminobenzene, 1,2-diaminobenzene, and analogs thereof.

Among these, the most suitable diamines for use in the polyimide/fluororesin laminate according to the present invention, 4,4'-diaminodiphenyl ether and p-phenylenediamine are particularly preferable, and a mixture of these in a molar ratio of 100:0 to 10:90 may be preferably used.

Especially preferable solvents for use in the synthesis of the polyamic acid are amido solvents, i.e. N,N-dimethylformamide, N,N-dimethylacetamide, N-methyl-2-pyrrolidone, and others. Among these, N,N-dimethylformamide may be particularly used.

A solution of polyamic acid obtained by polymerization of acid anhydride and diamine in the above-mentioned solvent preferably has a polyamic acid solid component concentration of 15 to 25 wt %. The concentration within this range gives a suitable molecular weight and a suitable solution viscosity.

The polyimide is obtained by imidization of the polyamic acid. This imidization is carried out either by the thermal curing method or the chemical curing method. Between these, the chemical curing method is preferable. The thermal curing method is a process in which the imidization reaction proceeds only by heating and without allowing a dehydrating ring-closing agent or the like to act.

The chemical curing method is a process in which a chemical imidization agent and a catalyst are allowed to act in an organic solvent solution of polyamic acid. The chemical imidization agent may be, for example, aliphatic acid anhydride, aromatic acid anhydride, N,N'-dialkylcarbodiimide, lower aliphatic acid halide, halogenated lower aliphatic acid anhydride, arylphosphonic acid dihalide, thionyl halide, or a mixture of two or more kinds of these. Among these, aliphatic acid anhydride such as acetic anhydride, propionic anhydride, lactic anhydride, or a mixture of two or more kinds of these may be preferably used.

As the catalyst, an aliphatic tertiary amine, an aromatic tertiary amine, a heterocyclic tertiary amine, and the like are used. Among these, isoquinoline, β-picoline, pyridine, and others may be particularly used.

The chemical curing method may be used in combination with the thermal curing method. The reaction condition of imidization may vary in accordance with the kind of the polyamic acid, film thickness, selection of the chemical curing method and/or the thermal curing method, and others.

Hereafter, an embodiment of a process for producing a polyimide film from an organic solvent solution of polyamic acid will specifically be described using the chemical curing method. The polyamic acid composition obtained in the above step is mixed with a chemical imidization agent and a catalyst, and thereafter is applied by flow casting on a support. Then, with mildly heating, for example, at about 100° C. to activate the chemical imidization agent and the catalyst, a partially cured or partially dried polyamic acid film (hereafter referred to as gel film) is produced.

The gel film is at an intermediate stage of conversion from polyamic acid to polyimide, and has self-supporting properties. The gel film is in a partially cured or partially dried state and contains a mixture of polyamic acid and converted polyimide. The gel film is adjusted so that its volatile component content and its imidization ratio are within predetermined ranges. The volatile component content is calculated by the following formula (1):

$$(A-B)\times 100/B \tag{1}$$

In the formula (1), A and B represent the following values:
A: weight of gel film
B: weight of gel film after being heated at 450° C. for 20 minutes The ratio of imidization is calculated from the following formula (2) by means of the infrared absorption spectrum analysis method:

$$(C/D)\times 100/(E/F) \tag{2}$$

In the formula (2), C, D, E, and F represent the following:
C: peak absorption height of gel film at 1370 $cm^{-1}$
D: peak absorption height of gel film at 1500 $cm^{-1}$
E: peak absorption height of polyimide film at 1370 $cm^{-1}$
F: peak absorption height of polyimide film at 1500 $cm^{-1}$ The volatile component content is within the range of 5 to 300%, preferably within the range of 5 to 100%, more preferably within the range of 5 to 50%. The ratio of imidization is within the range of not less than 50%, preferably within the range of not less than 70%, more preferably within the range of not less than 80%, most preferably within the range of not less than 85%.

To prevent contraction of the gel film in a tentering step, while ends of the film are held with a tenter clip or a pin for preventing contraction, the gel film is formed to be a polyimide film by gradually heating for drying and imidation. Specifically, it is preferable that the film is gradually heated from about 200° C. and finally heated at a temperature of not less than 500° C. for 15 to 400 seconds.

It is essential that, in the polyimide film to be used in the polyimide/fluororesin laminate of the present invention, the retention of the tear propagation resistance strength after being exposed to 150° C. 100% RH environment for 12 hours is not less than 80% of the tear propagation resistance strength before the exposure. The polyimide film whose tear propagation resistance strength exhibits a retention such as mentioned above against a high temperature and high humidity environment can be used in a laminate with fluororesin to produce a laminate having a high resistance against the high temperature and high humidity environment and an insulating tape for wire-winding being excellent in hydrolysis resistance.

The polyimide film satisfying the retention of the tear propagation resistance strength is not less than 80%, may be for example a polyimide film containing at least one kind of an element selected from the group consisting of Al, Si, Ti, Mn, Fe, Co, Cu, Zn, Sn, Sb, Pb, and Bi. These elements may be introduced into the polyimide film in any step of the above-mentioned steps for producing the polyimide film.

The element selected from the group consisting of Al, Si, Ti, Mn, Fe, Co, Cu, Zn, Sn, Sb, Pb, and Bi, and contained in the polyimide film having the above-mentioned property is preferably in the form of an organic or inorganic compound containing the above element. Specifically, the inorganic compound containing the element may be, for example, a halide such as chloride or bromide, oxide, hydroxide, carbonate, nitrate, nitrite, phosphate, sulfate, silicate, borate, condensed phosphate, or the like.

The organic compound containing the element may be, for example, an organic compound containing a neutral molecule such as an alkoxide, acylate, chelate, or diamine, or diphosphine, containing ions such as acetylacetonate ion, carboxylate ion, dithiocarbamate ion, or containing a cyclic ligand such as porphyrin.

Among these, preferable elements are Si, Ti, and Sn, and the particularly preferable element is titanium. Compounds containing these elements are given in the form of alkoxide, acylate, chelate, or a metal salt.

The compound containing titanium is preferably a compound represented by the following general formula (2):

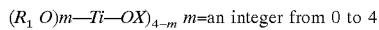

X:

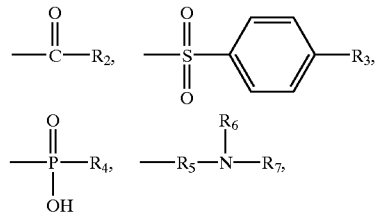

Group of carboxylic acid of $C_3$ to $C_{18}$ or its ammonium salt
$R_1$: Hydrocarbon group of —H or $C_3$ to $C_{18}$
$R_2$, $R_3$: Hydrocarbon group of $C_3$ to $C_{18}$
$R_4$: Hydrocarbon group of $C_3$ to $C_{18}$ or

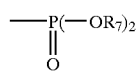

$R_5$, $R_6$: Hydrocarbon group of $C_3$ to $C_{18}$
$R_7$: Hydrocarbon group of $C_2$ to $C_{18}$ Concretely, the compound containing titanium may be, for example, tri-n-butoxytitanium monostearate, diisopropoxytitanium bis(triethanolaminate), butyl titanate dimer, tetranormalbutyl titanate, tetra(2-ethylhexyl) titanate, or titanium octylene glycolate, and also dihydroxybis(armronium lactate)titanium, dihydroxytitanium bislactate and others may be preferably used. The most preferable compound containing titanium is tri-n-butoxytitanium monostearate or dihydroxytitanium bislactate.

The concentration in the number of atoms of these elements on/in the film surface can be measured by the X-ray photoelectron spectrometry. The concentration in the number of atoms is within the range of 0.01 to 10 atomic %, preferably within the range of 0.1 to 5 atomic %, more preferably within the range of 0.2 to 1 atomic %. Within this range, a film having an excellent hydrolysis resistance can be obtained.

Several ways are available for introducing these elements into the polyimide film. For example, a process may be used in which a compound containing at least one kind of an element selected from the group consisting of Al, Si, Ti, Mn, Fe, Co, Cu, Zn, Sn, Sb, Pb, and Bi is mixed with a solution of polyamic acid, which is a precursor of polyimide, and thereafter the polyamic acid is converted into polyimide.

In the step of mixing the compound containing the element with the polyamic acid solution, the state of the compound containing at least one kind of an element selected from the group consisting of Al, Si, Ti, Mn, Fe, Co, Cu, Zn, Sn, Sb, Pb, and Bi, can be a liquid state, a colloidal state, a slurry state, or a solid state. In view of operability and homogeneous mixing, it is preferable to mix the compound in the form of a solution prepared by diluting the compound in a suitable solvent. Basically, the order of mixing acid anhydride, diamine, compound containing the element, chemical converting agent, and catalyst is not limited.

Another process for introducing the above-mentioned element into the polyimide film is a process in which, after the step of producing the gel film, a solution of a compound containing at least one kind of an element selected from the group consisting of Al, Si, Ti, Mn, Fe, Co, Cu, Zn, Sn, Sb, Pb, and Bi, is applied onto one or both surfaces of the gel film, and thereafter, the film is dried by heating to imidize the polyamic acid to produce a polyimide film.

The solution containing the above element may be applied onto one or both surfaces of the gel film by a known process that a person skilled in the art can perform. For example, the solution may be applied by a process such as gravure coating, spray coating, knife coating, or dip coating. In view of operability and simplicity of equipments, the dip coating method can be particularly used.

Here, in various processes for producing polyimide containing the element and used in the laminate of the present invention, the solvent is not defined but a solvent capable of dissolving the above-described compound, which is used in the solution containing the element when the compound containing the element is mixed with the polyamic acid solution, the solution of the compound containing the element when the solution is applied onto the gel film, or immersing the solution of the compound containing the element when the gel film has been immersed therein. For example, the solvent may be water, toluene, tetrahydrofuran, 2-propanol, 1-butanol, ethyl acetate, N,N-dimethylformamide, acetylacetone, or the like. Two or more kinds of these solvents may be mixed for use. In the present invention, N,N-dimethylformamide, 1-butanol, 2-propanol, and water may be particularly used.

It is preferable to add a step of removing superfluous liquid drops on the surface of the gel film after a step of application of or immersion into the solution of the compound containing the above element, because the step makes it possible to produce a polyimide film having an excellent appearance with no unevenness on the film surface.

The liquid drops can be removed by a known method using a nip roll, an air knife, a doctor blade, or the like, among which a nip roll is preferably used in view of film appearance, liquid draining, operability, and the like.

The gel film obtained by application of or immersion into the solution containing the above element is peeled off from the support; the ends of the gel film are fixed to prevent the contraction in curing; and the film is dried to remove water, the remaining solvent, the remaining imidization agent, and the catalyst to convert the polyamic acid into polyimide, thereby producing the polyimide film to be used in the polyimide laminate of the present invention. The drying condition is similar to the one used in the above-mentioned process of producing the polyimide.

To the polyimide film obtained by the above-mentioned various processes, an inorganic or organic filler, a plasticizer such as an organic phosphorus compound, or an antioxidant may be added by a known process, and also a known surface treatment such as a corona discharge treatment or a plasma discharge treatment may be carried out.

A suitable thickness of the polyimide film to be used in the present invention may be selected in accordance with its applications. Specifically, the thickness of the gel film is 5 to 300 $\mu$m, preferably 5 to 125 $\mu$m, more preferably 5 to 75 $\mu$m.

Next, the polyimide/fluororesin laminate of the present invention will be described. The polyimide/fluororesin laminate of the present invention is produced by laminating fluororesin on one or both surfaces of the polyimide film obtained in the above step, followed by baking. The process for producing the polyimide/fluororesin laminate may be any process known to those skilled in the art. For example, the laminate can be produced typically by a process of laminating film-like fluororesin on the polyimide film or by a process of applying a dispersion of fluororesin onto the polyimide film.

The fluororesin to be used in the present invention typically has a fluorine content of not less than 20 wt %, preferably 50 to 76 wt %. Specifically, the fluororesin may be, for example, tetrafluoroethylene-hexafluoropropylene copolymer (FEP), tetrafluoroethylene-perfluoroalkyl vinyl ether copolymer (PFA), tetrafluoroethylene-ethylene copolymer (ETFE), or polytetrafluoroethylene (PTFE) or the like.

A preferable dispersion to be used in the present invention is, for example, a dispersion of tetrafluoroethylene-hexafluoropropylene copolymer (hereafter referred to as FEP) or polytetrafluoroethylene in water or an organic solvent.

Specifically, in applying the dispersion, a dispersion of the above-mentioned fluororesin is prepared. The solid component concentration in the dispersion to be used here is not limited. However, the concentration is preferably 10 wt % to 70 wt % in view of facility in handling the dispersion.

The film to be used for lamination is representatively a film made, for example, of tetrafluoroethylene-hexafluoropropylene copolymer, polytetrafluoroethylene, tetrafluoroethylene-perfluoroalkyl vinyl ether copolymer, tetrafluoroethylene-ethylene copolymer, or polychlorotrifluoroethylene containing chlorine or the like.

As regards the thickness of the fluororesin to be used in the polyimide/fluororesin laminate of the present invention, if the dispersion is used, it can be applied several times until the film has a suitable thickness. Also, if the fluororesin is laminated as a film, the thickness of the film is suitably 7.5 to 125 $\mu$m.

An inorganic or organic filler may be added to the dispersion or the film by a known method. Also, the surface of the fluororesin or the surface to be in adhesion with the polyimide film may be subjected to a known surface treatment such as a corona discharge treatment or a plasma discharge treatment.

Next, the insulating tape for wire-winding of the present invention will be described. The insulting tape for wire-winding is used for coating a conductor in order to ensure insulation on the surface of the conductor. Basically, the conductor to be coated is not limited as long as it is a material having excellent electrical conductivity. For example, the conductor may be a wire, a rod-like or plate-like material of annealed copper, hard copper, oxygen free copper, chromium ore, or aluminum or the like. Further, magnesium, silicon, iron, or the like may be added to the above-mentioned materials if mechanical strength is required in these conductors.

The insulating tape for wire-winding of the present invention is processed into a tape form having a width suitable for a wire to be coated, and used for coating the above-mentioned materials. Specifically, the polyimide/fluororesin laminate in a tape form is wound around a conductor, and thereafter a predetermined heat treatment is performed to thermally fuse the fluororesin, whereby the coated wire is produced. A coated wire having an excellent hydrolysis resistance can be produced by coating a wire with the polyimide/fluororesin laminate of the present invention.

EXAMPLES

The present invention will be more clearly understood by referring to the Examples below. However, the Examples should not be construed to limit the invention in any way.

Effects of the present invention will specifically be described with reference to embodiments thereof. However, the present invention is not limited to the following embodiments, and various changes, modifications, and alterations will be apparent to those skilled in the art without departing from the spirit and scope of the present invention.

The tear propagation resistance strength in the Examples was measured according to ASTM D-1938. A retention was calculated as a ratio of the tear propagation resistance strength after being exposed to 150° C. 100% RH environment for 12 hours relative to the tear propagation resistance strength of a non-exposed film. Specifically, in hydrolysis resistance, "pass" or "fail" was determined according to SAE AS4373 method 602 by evaluating the voltage withstand after being immersed in a 70° C. aqueous solution of 5 wt % sodium chloride for 2000 hours.

Comparative Example 1

A converting agent composed of 17 g of acetic anhydride and 2 g of isoquinoline was mixed with 90 g of a DMF solution of 17 wt % polyamic acid synthesized with pyromellitic dianhydride/4,4'-diaminodiphenyl ether/p-phenylenediamine in a molar ratio of 4/3/1. After stirring and defoaming by centrifugation, the mixture was applied by flow casting to a thickness of 350 $\mu$m on an aluminum foil. The mixture was cooled at 0° C. during the step of stiring and defoaming. The laminate of aluminum foil and polyamic acid solution was heated at 110° C. for two minutes to obtain a gel film having self-supporting properties with 40% of volatile component content and 85% of imidization ratio. This gel film was peeled off from the aluminum foil and fixed to a frame. The gel film was heated at 300° C., 400° C., and 500° C. each for one minute to produce a polyimide film having a thickness of 25 $\mu$m. The tear propagation resistance of the polyimide film was measured before and after being exposed to 150° C. 100% RH environment for 12 hours. The results are shown in Table 1. The retention was 38%.

An FEP aqueous dispersion was applied on both surfaces of the polyimide film so that the FEP layers after baking would each have a thickness of 2.5 μm, followed by drying at 150° C. for one minute and baking at 415° C. for 15 seconds to prepare a polyimide/fluororesin laminate. A coated wire was fabricated by using the obtained polyimide/fluororesin laminate, and the voltage withstand was determined. The results are shown in

TABLE 1

| Unit | Tear propagation resistance strength | | | Voltage withstand |
|---|---|---|---|---|
| | Room temperature mN | After Exposure mN | Retention % | After the immersion of a NaCl solution for 2,000 hours |
| Comparative Example 1 | 73 | 28 | 38 | Rejection |
| Example 1 | 71 | 62 | 87 | Acceptance |
| Example 2 | 73 | 64 | 88 | Acceptance |
| Example 3 | 69 | 59 | 86 | Acceptance |
| Example 4 | 72 | 59 | 82 | Acceptance |
| Example 5 | 89 | 57 | 83 | Acceptance |

Example 1

A polyimide film, a polyimide/fluororesin laminate, and a coated wire were fabricated in the same manner as in Comparative Example 1 except that an organic titanium solution composed of 0.1 g of tri-N-butoxytitanium monostearate and 10 g of toluene was added to 90 g of the DMF solution of the polyamic acid. The results of determining the tear propagation resistance and the voltage withstand are shown in Table 1.

Example 2

A polyimide film, a polyimide/fluororesin laminate, and a coated wire were fabricated in the same manner as in Comparative Example 1 except that the gel film was immersed for 10 seconds in a tri-N-butoxytitanium monostearate / 1-butanol solution having a titanium element concentration of 100 ppm, and superfluous liquid drops were removed. The results of determining the tear propagation resistance and the voltage withstand are shown in Table 1.

Example 3

A polyimide film, a polyimide/fluororesin laminate, and a coated wire were fabricated in the same manner as in Comparative Example 1 except that the gel film was immersed for 10 seconds in a dihydroxytitanium bislactate/ 1-butanol solution having a titanium element concentration of 100 ppm, and superfluous liquid drops were removed. The results of determining the tear propagation resistance and the voltage withstand are shown in Table 1.

Example 4

A polyimide film, a polyimide/fluororesin laminate, and a coated wire were fabricated in the same manner as in Comparative Example 1 except that a dihydroxytitanium bislactate/aqueous solution having a titanium element concentration of 100 ppm was applied onto the gel film by the spray coating method so that superfluous liquid would not adhere to the film. The results of determining the tear propagation resistance and the voltage withstand are shown in Table 1.

Example 5

A polyimide film, a polyimide/fluororesin laminate, and a coated wire were fabricated in the same manner as in Comparative Example 1 except that 0.2 g of stannous chloride was added to 90 g of the DMF solution of the polyamic acid. The results of determining the tear propagation resistance and the voltage withstand are shown in Table 1.

Comparative Example 2

A polyimide film, a polyimide/fluororesin laminate, and a coated wire were fabricated in the same manner as in Comparative Example 1 except that pyromellitic dianhydride/p-phenylenebis(trimellitic acid monoester acid anhydride)/p-phenylenediamine/4,4'-diaminodiphenyl ether were synthesized in a molar ratio of 1/1/1/1. The results of determining the tear propagation resistance and the voltage withstand are shown in Table 2.

Example 6

A polyimide film, a polyimide/fluororesin laminate, and a coated wire were fabricated in the same manner as in Example 2 except that pyromellitic dianhydride/p-phenylenebis (trimellitic acid monoester acid anhydride)/p-phenylenediamine/4,4'-diaminodiphenyl ether were synthesized in a molar ratio of 1/1/1/1. The results of determining the tear propagation resistance and the voltage withstand are shown in Table 2.

TABLE 2

| Unit | Tear propagation resistance strength | | | Voltage withstand |
|---|---|---|---|---|
| | Room temperature MN | After Exposure mN | Retention % | After the immersion of a NaCl solution for 2,000 hours |
| Comparative Example 2 | 48 | 18 | 38 | Rejection |
| Example 6 | 50 | 44 | 88 | Acceptance |

Comparative Example 3

A polyimide film, a polyimide/fluororesin laminate, and a coated wire were fabricated in the same manner as in Comparative Example 1 except that pyromellitic dianhydride/4,4'-diaminodiphenyl ether were synthesized in a molar ratio of 1/1. The results of determining the tear propagation resistance and the voltage withstand are shown in Table 3.

Example 7

A polyimide film, a polyimide/fluororesin laminate, and a coated wire were fabricated in the same manner as in Example 2 except that pyromellitic dianhydride/4,4'-diaminodiphenyl ether were synthesized in a molar ratio of 1/1. The results of determining the tear propagation resistance and the voltage withstand are shown in Table 3.

TABLE 3

| Unit | Tear propagation resistance strength | | | Voltage withstand |
|---|---|---|---|---|
| | Room temperature mN | After Exposure mN | Retention % | After the immersion of a NaCl solution for 2,000 hours |
| Comparative | 74 | 27 | 36 | Rejection |

TABLE 3-continued

| | Tear propagation resistance strength | | | Voltage withstand |
|---|---|---|---|---|
| Unit | Room temperature mN | After Exposure mN | Retention % | After the immersion of a NaCl solution for 2,000 hours |
| Example 3 Example 7 | 71 | 58 | 82 | Acceptance |

There has thus been shown and described polyimide/fluoresin laminates, producing method thereof, and insulating tape for wire-winding using the sane which fulfill all the objects and advantages sought therefor. Many changes, modifications, variations and other uses and applications of the subject invention, will, however, become apparent to those skilled in the art after considering this specification which disclose the preferred embodiments thereof. All changes, variations and other uses and applications which of not depart from the spirit or scope of the present invention are deemed to be covered by the invention, which is to be limited only by the claims which follow.

What is claimed is:

1. A polyimide/fluororesin laminate which is obtained by laminating a fluororesin layer on one or both surfaces of a polyimide film, wherein said polyimide film has a retention of a tear propagation resistance strength, after being exposed to 150° C. 100% RH environment for 12 hours. of not less than 80% of said tear propagation resistance strength of said polyimide film before exposure.

2. A polyimide/fluororesin laminate according to claim 1, wherein said polyimide film contains at least one element selected from the group consisting of Al, Si, Ti, Mn, Fe, Co, Cu, Zn, Sn, Sb, Pb, and Bi.

3. The polyimide/fluororesin laminate according to claim 2, wherein said polyimide film includes at least Ti.

4. The polyimide/fluororesin laminate according to claim 2, wherein said polyimide film is produced by a process comprising:

(a) adding at least one compound containing an element selected from the group consisting of Al, Si, Ti, Mn, Fe, Co, Cu, Zn, Sn, Sb, Pb, and Bi, to polyamic acid which is a precursor of said polyimide; and (b) converting said polyamic acid to said polyimide film.

5. The polyimide/fluororesin laminate according to claim 2, wherein said polyimide film is produced by a process comprising:

(a) producing a gel film by partially imidizing a polyamic acid;

(b) applying an organic solvent solution of a compound containing at least one kind of an element selected from the group consisting of Al, Si, Ti, Mn, Fe, Co, Cu, Zn, Sn, Sb, Pb, and Bi, on at least one surface of said gel film;

(c) converting said gel film to a polyimide film; and (d) drying said polyimide film.

6. The polyimide/fluororesin laminate according to claim 4 or wherein a compound containing at least one element is an organic titanium compound represented by the following formula (1):

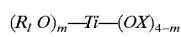

wherein m represents an integer from 0 to 4,

X represents

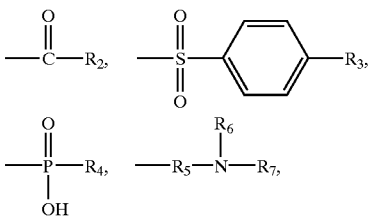

a $C_3$ to $C_{18}$ hydrocarbon group, or a $C_3$ to $C_{18}$ carboxyl group or an ammonium salt thereof, wherein $R_1$ represents a $C_3$ to $C_{18}$ hydrocarbon group $R_2$ represents a $C_3$ to $C_{18}$ hydrocarbon group, $R_3$ represents a $C_3$ to $C_{18}$ hydrocarbon group, $R_4$ represents a $C_3$ to $C_{18}$ hydrocarbon group or

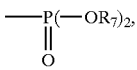

$R_5$ represents a $C_3$ to $C_{18}$ hydrocarbon group, $R_6$ represents a $C_3$ to $C_{18}$ hydrocarbon group and, $R_7$ represents a $C_2$ to $C_{18}$ hydrocarbon group.

7. The insulating tape for wire-winding obtained by processing a polyimide/fluororesin laminate according to claim 2 into a tape form.

8. Insulating tape for wire-winding obtained by processing a polyimide/fluororesin laminate according to claim 1 into a tape.

9. A process for producing polyimide/fluororesin laminate according to claim 1, wherein said process comprises (1) producing a polyimide by a process comprising:
 (a) adding at least one kind of a compound containing an element selected from the group consisting of Al, Si, Ti, Mn, Fe, Co, Cu, Zn, Sn, Sb, Pb, and Bi, to polyamic acid which is a precursor of said polyimide film; and
 (b) converting said polyamic acid to said polyimide film; and (2) laminating a fluororesin layer on one or both surfaces of said polyimide film.

10. A process of producing a polyimide/fluororesin laminate according to claim 1, wherein said process comprises:

(1) producing a polyimide by a process comprising:
 (a) producing a gel film obtained by partial imidization of a polyamic acid;
 (b) applying an organic solvent solution of a compound contain at least one element selected from the group consisting of Al, Si, Ti, Mn, Fe, Co, Cu, Zn, Sn, Sb, Pb, and Bi, onto one or both surfaces of said gel film;
 (c) drying said film; and (2) laminating a fluororesin layer on at least one surface of said polyimide film.

* * * * *